UNITED STATES PATENT OFFICE.

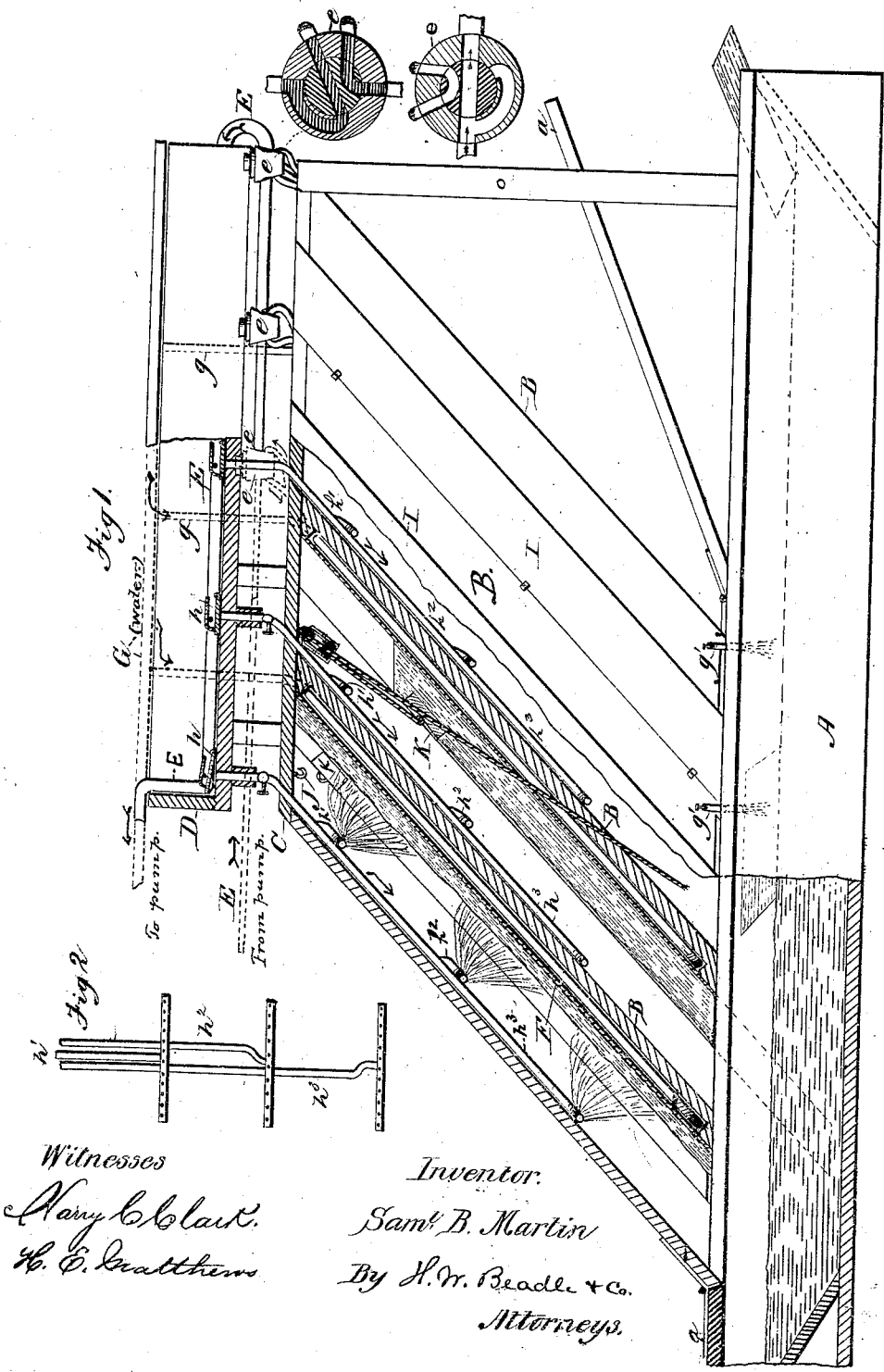

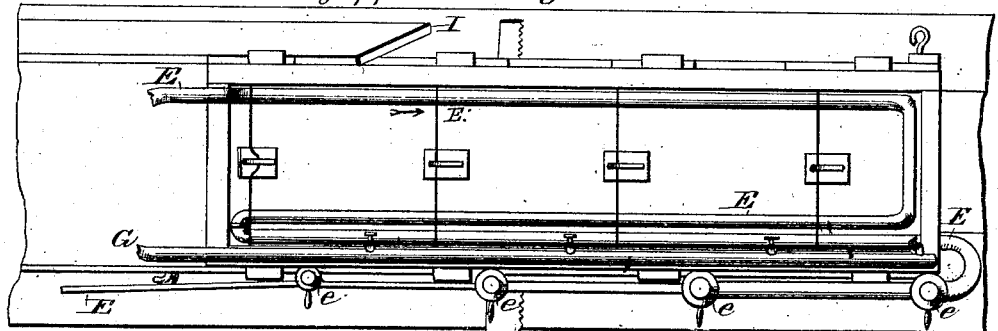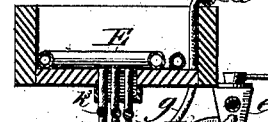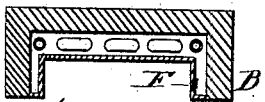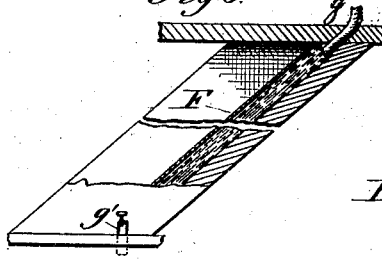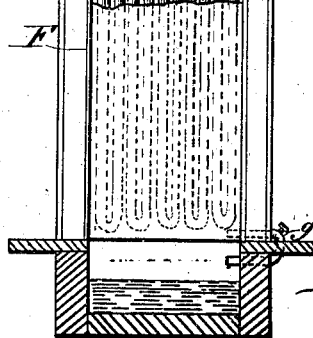

SAMUEL B. MARTIN, OF SAN FRANCISCO, CALIFORNIA.

IMPROVEMENT IN ICE-MACHINES.

Specification forming part of Letters Patent No. 162,397, dated April 20, 1875; application filed June 29, 1874.

*To all whom it may concern:*

Be it known that I, SAMUEL B. MARTIN, of San Francisco, county of San Francisco and State of California, have invented certain new and useful Improvements in Machines for the Manufacture of Ice, and refrigerating purposes; and I do hereby declare that the following is a full, clear, and exact description of the same, reference being had to the accompanying drawings and to letters marked thereon.

This invention consists mainly, first, in a novel method of making ice, consisting essentially in spraying water upon freezing-surfaces, inclined from the vertical for the purpose of retarding the movement of the water, and causing it to spread, by the action of gravity, in thin films over the surfaces; second, in the employment of certain congealing chambers, adapted for independent operation, but contiguously united to form a single series; third, in the peculiar construction of these congealing-chambers, the same being closed in on every side for the purpose of excluding external air of a higher temperature; fourth, in the peculiar construction of the inclined freezing-plates; fifth, in the employment of a canal or tank located beneath the chambers, and with which they communicate. It further consists in certain details of construction, which, in connection with the foregoing, will be fully described hereinafter.

My invention may be generally described as follows:

I employ a series of independent but contiguous congealing-chambers, arranged in an inclined position above a tank; said chambers having trough-like freezing-plates, cooled by pipes in the rear, upon which the water to be frozen is delivered in the form of spray, the same being spread by the action of gravity into thin films, and so retarded in its movement by the incline of the plate from the vertical that it may be frozen before it can flow off from the plate. If, by accident, an excess of water is sprayed upon the plate, it is caught in the lower tank. To detach the ice, water of a proper temperature is allowed to flow beneath the freezing-plates in the space not occupied by the coil, and discharge into the lower tank, by which means the temperature is raised sufficiently for that purpose. A represents a tank or canal, constructed of proper material and suitable size, which forms the substructure or base portion of the machine, and which is extended beyond the base of the congealing-chambers to any suitable distance upon either side. *a a* represent suitable doors covering the upper part of the tank, upon either side of the congealing-chambers, which may be opened, when desired, for the purpose of removing the ice. B B B represent troughs or frames located at regular and proper distances apart, and held in a position inclined from the vertical, at a proper angle, as shown. C represents a ceiling adapted to cover the upper ends of the troughs, as shown. D represents an upper tank, in which is cooled the water sprayed upon the freezing-plates to form ice. E represents a pipe through which passes a volatile liquid or refrigerant, the same being connected at one extreme end to a receiver, and at the other to a pump, in the usual well-known manner, its central portion being arranged in a series of coils, located upon the floors of the inclined troughs B, as indicated in Figs. 1, and 4, each set of the series being controlled by a two-way cock, *e*, Fig. 1, adapted to permit the vaporizing-liquid in its passage from the receiver to the pump to flow either through the coil and then pass on to the next cock of the series, or to pass directly on without affecting the coil, as may be desired. This pipe, it will be observed, is increased in diameter between each cock and under the freezing plates for the purpose of providing for the expansion of the volatile liquid into gas, as it receives more and more heat in its movement through the coils. A portion of the pipe is also coiled within the upper tank, as shown, Fig. 3, in order that the refrigerant in its passage to the pump may cool the water, which is subsequently sprayed upon the freezing-plates to make ice. F represents a metal freezing-plate, secured within the trough and resting upon the coil of refrigerating-pipes, as shown. G represents a main pipe, receiving water from any suitable source, which is provided with branch pipes *g g*, each of which communicates with the space or chamber formed between the freezing-plate and the bottom of the trough, in which lie the refrigerating-coils, the water passing around and about the coils as indicated in Figs. 4 and 6.

Each branch pipe is controlled by an independent cock, as shown in Figs. 3 and 6. $g'$ represents a discharge-pipe at the bottom of each chamber, also provided with a cock through which the water may be permitted to flow off into the lower tank. $h\ h$ represent valves adapted to control openings in the bottom of the upper tank, which openings communicate with the independent pipes $h^1\ h^2\ h^3$ of different lengths, secured to the upper side of each chamber, each of which is provided with the transverse spray-pipe, as shown. Each of these pipes is provided with an independent cock, as shown. I I represent doors adapted to close the openings between the chambers, as shown. By means of these doors close freezing-chambers are formed. J represents an eye-bolt, properly secured to the ceiling, and K a block of iron, also provided with an eye, which is adapted to be frozen into the ice, as shown.

The operation of the machine is as follows: The vaporizing-liquid is permitted to flow through the coils located beneath the freezing-plates in each chamber. Water from the upper tank is then admitted into the independent pipes $h^1\ h^2\ h^3$, and delivered from them upon the freezing-plates at different points in the form of spray, the same being spread by the action of gravity into thin films, but so retarded in its movement that it may be frozen before it can flow from the plate. This water should be filtered before being used, in order that the perforated distributing-pipes may not become clogged. When the ice has been formed the proper thickness the flow of water through the valve $h$ is stopped, and also the flow of the volatile liquid through the coil, and water from pipe G, of moderate temperature, is allowed to flow through the space in rear of the freezing-plate not occupied by the coil, by which means the temperature is sufficiently raised to loosen the ice. The same may then be lowered into the tank below by suitable block and tackle attached to the eyes J K, as shown. As the ice is lowered into the tank it may be cut into blocks by the introduction of a saw into the opening $x$, as shown in Fig. 3. It will be understood, of course, that each chamber is entirely independent of every other one, and that ice may be formed therein or removed therefrom without affecting at all the operation of the rest. Very marked advantages are produced by the construction described. The water to be frozen is affused in very fine streams upon the plates, and spread by the action of gravity in thin films, but so retarded in its movement as to be readily affected by the freezing action. To produce the best results care should be taken that the water should not be delivered upon the plate faster than it congeals, but if any excess is delivered to the plate it will be caught in the tank below. The freezing-chambers being independent of each other the ice may be removed from one while the freezing action continues in the remainder. By arranging these in a continuous series the inner chambers are protected by the outer, and all are less liable to be affected by the external temperature. The construction of the inclined freezing-plates and troughs is simple, yet well adapted for the purpose designed. By the employment of the closed canal the removal of the ice and its conveyance to the desired point is rendered easy.

Having thus fully described my invention, what I claim as new, and desire to secure by Letters Patent, is—

1. The process described, consisting essentially in spraying water upon freezing-surfaces, inclined from the vertical, for the purpose of retarding the movement of the water and causing it to spread, by the action of gravity, in thin films over the plate, substantially as described.

2. The series of contiguous congealing-chambers, operating independently, but united to form a single series, substantially as described.

3. The combination of the trough-like frames, with ceilings and doors for the purpose of making close congealing-chambers, substantially as described.

4. The combination of the inclined trough, the trough-like freezing-plates, and the refrigorating coil, substantially as described.

5. In combination with the freezing-chambers, the canal provided with doors, as de-described.

6. The combination of a freezing-plate inclined from the vertical, as described, with a suitable spraying apparatus, substantially as set forth.

7. The combination of the eye-bolt, the ice-block, and suitable connecting-tackle, as and for the purpose described.

8. The combination of the upper tank, the series of valves $h\ h$, and the series of independent spray pipes $h^1\ h^2\ h^3$, as described.

9. The machine described, consisting of the following elements: an upper and lower tank, an intermediate series of close freezing-chambers, a system of cooling-pipes, and a water-space for detaching purposes, combined substantially as set forth.

In witness whereof I have hereunto set my hand and seal.

SAML. B. MARTIN. [L. S.]

Witnesses:
 RAMON DE ZALDI,
 C. W. M. SMITH.